(12) United States Patent
Chavez et al.

(10) Patent No.: US 8,571,474 B2
(45) Date of Patent: Oct. 29, 2013

(54) PERFORMING ROUTING OF A PHONE CALL THROUGH A THIRD PARTY DEVICE

(75) Inventors: Timothy R. Chavez, Austin, TX (US);
Jacob D. Eisinger, Austin, TX (US);
Michael C. Hollinger, Austin, TX (US);
Jennifer E. King, Austin, TX (US);
Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 12/115,663

(22) Filed: May 6, 2008

(65) Prior Publication Data

US 2009/0280787 A1    Nov. 12, 2009

(51) Int. Cl.
*H04B 7/00* (2006.01)

(52) U.S. Cl.
USPC ....... 455/41.2; 455/461; 455/426.1; 455/403; 379/201.01; 370/352

(58) Field of Classification Search
USPC ................ 455/461, 417, 41.2, 426, 445, 403, 455/422.1; 379/201.01; 370/352, 395.52
See application file for complete search history.

(56) References Cited

U.S. PATENT DOCUMENTS

| | | |
|---|---|---|
| 6,404,860 B1 | 6/2002 | Casellini |
| 6,421,437 B1 | 7/2002 | Slutsman |
| 6,741,688 B1 | 5/2004 | Yau |
| 7,260,205 B1 | 8/2007 | Murphy |
| 7,319,744 B1 | 1/2008 | Arnold |
| 2003/0033394 A1 | 2/2003 | Stine |
| 2003/0120805 A1* | 6/2003 | Couts et al. .................. 709/238 |
| 2003/0138085 A1 | 7/2003 | Forman |
| 2004/0202300 A1* | 10/2004 | Cooper et al. ........... 379/201.01 |
| 2005/0286705 A1 | 12/2005 | Contolini et al. |
| 2006/0009155 A1* | 1/2006 | Paalasmaa et al. .......... 455/41.2 |
| 2006/0077956 A1* | 4/2006 | Saksena et al. ............... 370/352 |
| 2006/0077957 A1 | 4/2006 | Reddy |
| 2006/0093118 A1 | 5/2006 | Agrawal et al. |
| 2006/0135138 A1* | 6/2006 | Lazaridis ...................... 455/417 |
| 2006/0159067 A1* | 7/2006 | Chen et al. .................... 370/352 |
| 2007/0032225 A1* | 2/2007 | Konicek et al. ............... 455/417 |

(Continued)

OTHER PUBLICATIONS

U.S. Appl. No. 12/115,649, "Method and System for Performing Proximity Based Routing of a Phone Call," Non-Final Office Action dated Aug. 9, 2011.

(Continued)

*Primary Examiner* — Wesley Kim
*Assistant Examiner* — Joseph Dean, Jr.
(74) *Attorney, Agent, or Firm* — Yudell Isidore Ng Russell PLLC

(57) ABSTRACT

A method, system, and computer program for routing an outgoing communication in real time is presented. A communication is received from a caller to an intended receiving wireless telecommunication device. In response to the communication failing to connect to the intended receiving wireless telecommunication device, a host carrier initiated query of third party priority of contacts routing preferences of the intended receiving wireless telecommunication device is initiated to determine if other communication devices are available for receiving a re-route of the original communication. If third party routing preferences of the intended receiving wireless telecommunication device have previously been established, then the call is rerouted through one or more alternate telecommunication devices to the intended receiving wireless telecommunication device. The priority of contacts is stored with the host carrier.

20 Claims, 3 Drawing Sheets

(56) References Cited

U.S. PATENT DOCUMENTS

| | | | |
|---|---|---|---|
| 2007/0232277 A1 | 10/2007 | Spalink | |
| 2007/0287438 A1 | 12/2007 | Hansen | |
| 2008/0004009 A1 | 1/2008 | Caldwell | |
| 2008/0112554 A1 | 5/2008 | Arnold | |
| 2008/0130554 A1* | 6/2008 | Gisby et al. | 370/328 |
| 2009/0023427 A1* | 1/2009 | Kahn et al. | 455/414.1 |
| 2009/0086947 A1* | 4/2009 | Vendrow | 379/201.12 |
| 2009/0279677 A1 | 11/2009 | Chavez | |
| 2009/0279680 A1 | 11/2009 | Chavez | |
| 2009/0280785 A1 | 11/2009 | Chavez | |
| 2009/0280817 A1 | 11/2009 | Chavez | |
| 2009/0280818 A1 | 11/2009 | Chavez | |
| 2011/0021150 A1* | 1/2011 | Lin | 455/41.2 |

OTHER PUBLICATIONS

U.S. Appl. No. 12/115,659, "Method and System for Performing Caller Based Routing of a Phone Call," Non-Final Office Action dated Aug. 9, 2011.

U.S. Appl. No. 12/115,654, "Method and System for Performing Recipient Based Routing of a Phone Call," Non-Final Office Action dated Jun. 28, 2011.

U.S. Appl. No. 12/115,649 entitled "Performing Proximity Based Routing of a Phone Call" Non-final office action dated Oct. 17, 2012.

U.S. Appl. No. 12/115,673 entitled "Method and System for Performing Routing of a Phone Call Based on Mutual Contacts of a Contact List"; Notice of Allowance dated Oct. 19, 2012.

U.S. Appl. No. 12/115,654 entitled "Performing Recipient Based Routing of a Phone Call"; Final office action dated Jan. 12, 2012.

U.S. Appl. No. 12/115,654 entitled "Performing Recipient Based Routing of a Phone Call"; Notice of Allowance dated Apr. 6, 2012.

U.S. Appl. No. 12/115,649 entitled "Performing Proximity Based Routing of a Phone Call"; Final office action dated Feb. 21, 2012.

U.S. Appl. No. 12/115,673 entitled "Method and System for Performing Routing of a Phone Call Based on Mutual Contacts of a Contact List"; Final office action dated Mar. 26, 2012.

U.S. Appl. No. 12/115,673 entitled "Method and System for Performing Routing of a Phone Call Based on Mutual Contacts of a Contact List"; Non-final office action dated Oct. 24, 2011.

U.S. Appl. No. 12/115,684 entitled "Method and System to Prevent Unintended Users From Accessing a Re-Routed Communication"; Non-final office action dated Mar. 29, 2012.

U.S. Appl. No. 12/395,910 entitled "Urgent Communications That Overcome Receiving Device Impediments"; Notice of Allowance dated Jun. 1, 2012.

U.S. Appl. No. 12/395,910 entitled "Urgent Communications That Overcome Receiving Device Impediments"; Non-final office action dated Jul. 26, 2011.

U.S. Appl. No. 12/115,684 entitled "Method and System to Prevent Unintended Users From Accessing a Re-Routed Communication"; Notice of Allowance dated Aug. 20, 2012.

* cited by examiner

PERFORMING ROUTING OF A PHONE CALL THROUGH A THIRD PARTY DEVICE

BACKGROUND OF THE INVENTION

1. Technical Field

The present invention relates in general to telecommunications, and in particular to cellular phones. Still more particularly, the present invention relates to performing routing of a phone call through a third party device.

2. Description of the Related Art

Cellular (cell) phones have become a ubiquitous aid in allowing a person to be constantly accessible. However, there are times when a person may not desire, or may be unable, to take an incoming call.

SUMMARY OF THE INVENTION

A method, system, and computer program for routing an outgoing communication in real time is presented. A communication is received from a caller to an intended receiving wireless telecommunication device. In response to the communication failing to connect to the intended receiving wireless telecommunication device, a host carrier initiated query of third party priority of contacts routing preferences of the intended receiving wireless telecommunication device is initiated to determine if other communication devices are available for receiving a re-route of the original communication. If third party routing preferences of the intended receiving wireless telecommunication device have previously been established, then the call is rerouted through one or more alternate telecommunication devices to the intended receiving wireless telecommunication device. The priority of contacts is stored with the host carrier.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
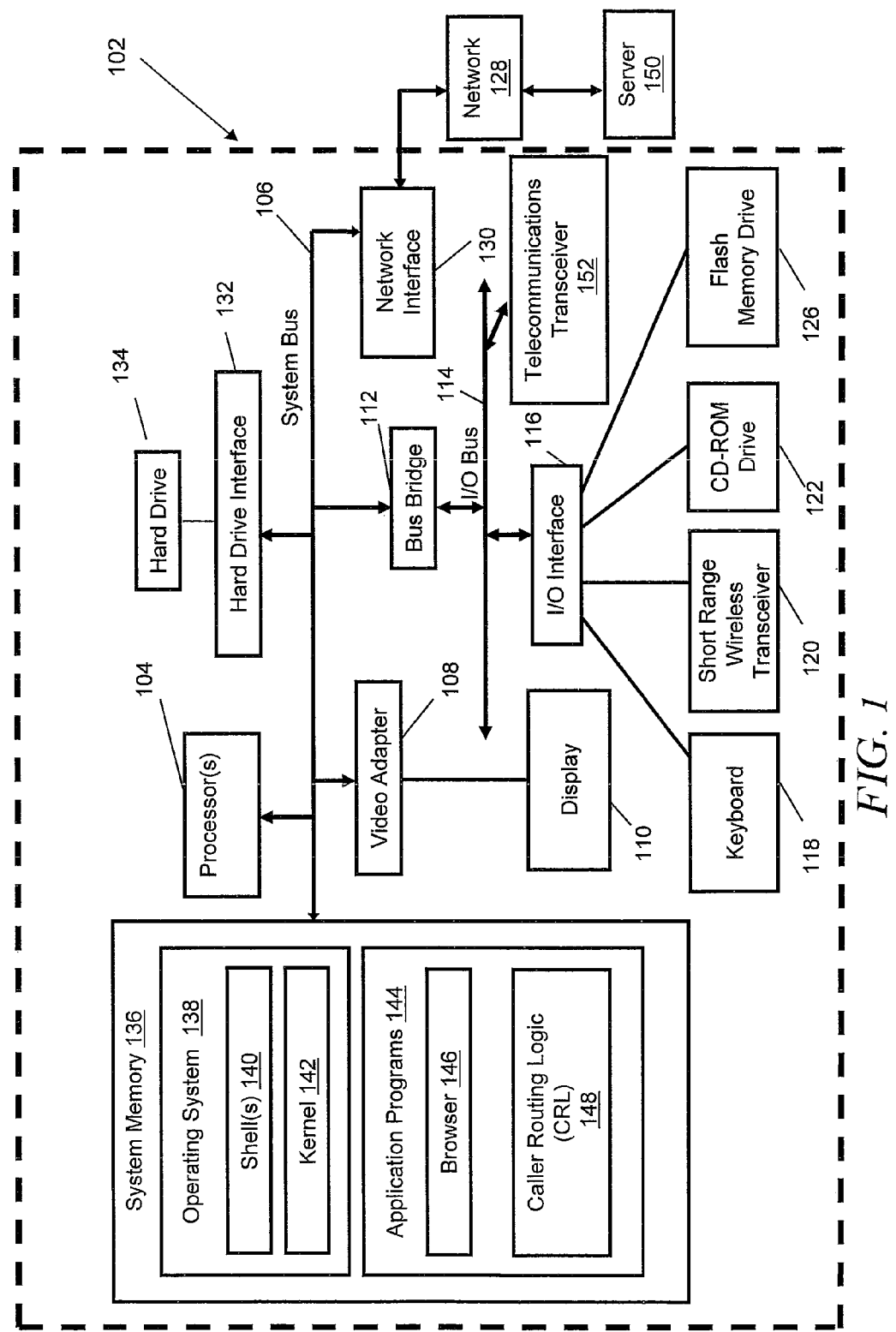
FIG. 1 is a block diagram of a data processing system in which the present invention may be implemented.

With reference now to FIG. 1, there is depicted a block diagram of an exemplary computer 102 in which the present invention may be implemented. Computer 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a Short Range Wireless Transceiver 120, a Compact Disk-Read Only Memory (CD-ROM) drive 122, a floppy disk drive 124, and a flash drive memory 126. Keyboard 118 may be a standard keyboard (e.g., QWERTY style or similar), or a condensed alphanumeric keypad. The format of the ports connected to I/O interface 116 may be any known to those skilled in the art of computer architecture, including but not limited to Universal Serial Bus (USB) ports. Short Range Wireless Transceiver 120 utilizes short range wireless electromagnetic signals (e.g. wireless spread spectrum, radio frequency (RF), inferred (IR), etc) to allow Computer 102 to transmit or receive voice or data with another telecommunication device.

Computer 102 is able to communicate with a software deploying server 150 via a network 128 using a network interface 130, which is coupled to system bus 106. Network interface 130 may utilize a wired, or a wireless technology such as a cellular broadcast to connect with Network 128. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (e.g., computer 102) to send and receive network messages to the Internet using HyperText Transfer Protocol (HTTP) messaging, thus enabling communication with software deploying server 150.

Application programs 144 in computer 102's system memory (as well as software deploying server 150's system memory) also include a Caller Routing Logic (CRL) 148. CRL 148 includes code for implementing the processes described in FIGS. 2-3. In one embodiment, computer 102 is able to download CRL 148 from software deploying server 150, including in an "on demand" basis, as described in greater detail below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of CRL 148), thus freeing computer 102 from having to use its own internal computing resources to execute CRL 148.

Note also the architecture shown in FIG. 1 for computer 102 may be substantially implemented in Caller Telecommunication Device (CTD) 202, Host Carrier 206, Intended Receiving Wireless Telecommunication Device (IRWTD) 204, and Alternate Telecommunication Devices (ATDs) 208a-n shown below in FIG. 2. That is, although CTD 202, IRWTD 206 and ATDs 208a-n are described as cellular phones, by including a telecommunications transceiver 152 in the architecture of computer 102, the appropriate elements illustrated as components of computer 102 can operate as a "smart" phone that communicates with a wireless host carrier (e.g., Host Carrier 204 shown below in FIG. 2), or a Plain Old Telephone System (POTS) system. Additionally, by including a Short Range Wireless Transceiver 120 in the architecture of computer 102, the appropriate elements illustrated as components of computer 102 can operate as an "ad-hoc" network device that communicates with another telecommunication device within a wireless short range proximity to computer 102 (e.g., Alternate Telecommunication Devices (ATDs) 208a-n shown below in FIG. 2).

Figure 2:
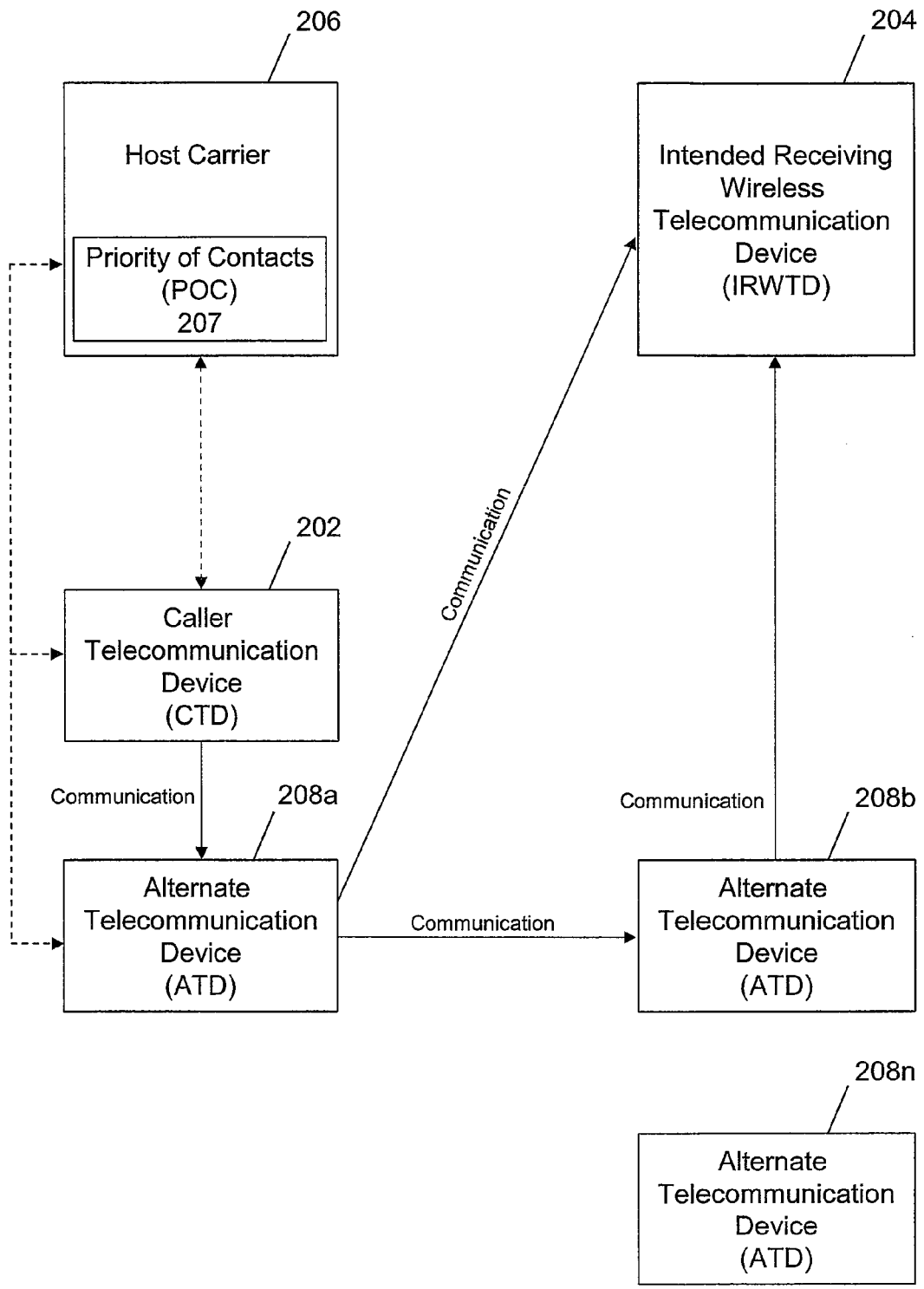
FIG. 2. is a block diagram of an exemplary system for performing re-routing of a phone call through a third party alternate telecommunication device.

With reference now to FIG. 2, a block diagram of the routing system used in an exemplary embodiment of the present invention is presented. A Caller Telecommunication Device (CTD) 202 (e.g., a cell phone, a Plain Old Telephone System (POTS) land line, a cell-capable Personal Assistant Device (PDA), etc.) connected to Host Carrier 206 initiates a communication (voice call or notification message) to an Intended Receiving Wireless Telecommunication Device (IRWTD) 204. Host Carrier 206 is a remote service host such as a cellular service provider that is remotely connected to both CTD 202 and IRWTD 204. If IRWTD's 204 ringer is "on", and thus the called user is available, the communication will be connected. As described below, however, when IRWTD 204 is otherwise unavailable, the communication intended for IRWTD 204 may be routed through a one or more Alternate Telecommunication Devices 208a-n to a preferred Alternate Telecommunication Device 208 when the user of IRWTD 204 has previously configured a Priority of Contacts (POC) 207 profile stored on Host Carrier 206.

When the user of IRWTD 204 cannot be reached by the desired method telecommunication method (e.g., direct cellular access, etc), a first option is for the caller who is using CTD 202 to leave a voicemail message, which will be retrievable when IRWTD 204 is either turned back on or the user becomes available. However, the user of IRWTD 204 may optionally configure a POC 207, stored on Host Carrier 206, which enables the automatic re-routing of an incoming communication through an ATD 208a-n to IRWTD 204. POC 207 is a priority based list of contacts and routing preferences, setup by the user of IRWTD 204. POC 207 governs where an incoming communication may or may not be re-routed to. Additionally, POC 207 may specify to always attempt to route a communication to a specific ATD 208a-n or to attempt re-routing of the communication to a specific set of ATDs 208a-n in a preferred sequence, as specified by the user or IRWTD 204. The communication may be a voice call, voice message, or a notification message (e.g., email, SMS message, MMS message, etc.) composed by the user of CTD 202, or translated via speech-to-text software of Host Carrier 206.

CTD 202 is connected to a remote Host Carrier 206 which determines if IRWTD 204 is available before connecting the call. When Host Carrier 206 detects that IRWTD 204 is unavailable it checks for the presence of POC 207 for IRWTD 204 and reads the information of POC 207 if available. By utilizing POC 207, Host Carrier 206 determines which ATDs 208a-n are available by detecting which ATDs are connected to the Host Carrier 206. ATDs 208a-n may be connected to Host Carrier 206 directly or indirectly by any real-time means (e.g., a network cellular broadcast, the Internet, short range wireless network, etc). Host Carrier 206 initiates a scan to determine which ATDs 208a-n connected to the Host Carrier 206 are also connected to IRWTD 204 and are available to receive the incoming communication. This is accomplished by Host Carrier 206 issuing an instruction of all available ATDs 208a-n specified in POC 207 to scan for the presence of IRWTD 204 in physically proximate short range by utilizing a common hardware based technology internal to IRWTD 204 and an ATD 208 (e.g., a network cellular broadcast, the Internet, short range wireless network, etc). Optionally an unlicensed secure wireless personal area network (PAN), may be implemented for wireless transmission. The short range of the device is the maximum range of communication available between ATD 208a and one or more of the ATD 208b-n without the use of a network carrier service (e.g., a cell phone carrier service), and is further determined by the internal technology common to ATDs 208a-n and IRWTD 204.

For example, when the primary ATD 208a of POC 207 is available and connected to IRWTD 204 through a local area network (LAN) the communication may be connected between ATD 208a and CTD 202. The communication is then re-routed through ATD 208a to IRWTD 204 and maintained for the duration of the communication (e.g., until the CTD 202 or IRWTD 204 hangs up the call, until the text message is transmitted successfully, etc). It is important to note that, ATD 208a-n may a telecommunication device, a personal computer, or a combination of any number of telecommunication devices or personal computers.

In some cases the first ATD 208a listed for POC 207 maybe unavailable. When this occurs logic internal to Host Carrier 206 determines if another re-route of the communication to ATD 208b-n should be attempted, or if the communication re-routing should be abandoned. POC 207 allows for specifying a maximum number of re-route attempts. When the maximum number of re-routing attempts has been met and the communication is not yet connected to IRWTD 204, software internal to CTD 202 (e.g. CRL 148) will instruct the user to leave a voicemail message, which will be retrievable when IRWTD 204 is either turned back on or the user becomes available.

When the maximum number of routing attempts have not yet been met, the communication may be re-routed through multiple ATDs 208a-n in an effort to connect the communication to IRWTD 204. For example, when ATD 208a has no direct or indirect connection available to IRWTD 204, but is connected to ATD 208b, wherein ATD 208b is unavailable by a direct connection to Host Carrier 206 but is directly connected to IRWTD 204 by a short range personal area network, POC 207 may allow for routing of the communication from CTD 202 through ATD 208a and ATD 208b to IRWTD. Re-routing the communication through multiple ATDs 208a-n may incorporate additional technologies to transfer or translate the communication between voice and text as necessary (e.g., Voice over Internet Protocol (VOIP), text-to-speech translation, or speech-to-text translation).

Figure 3:
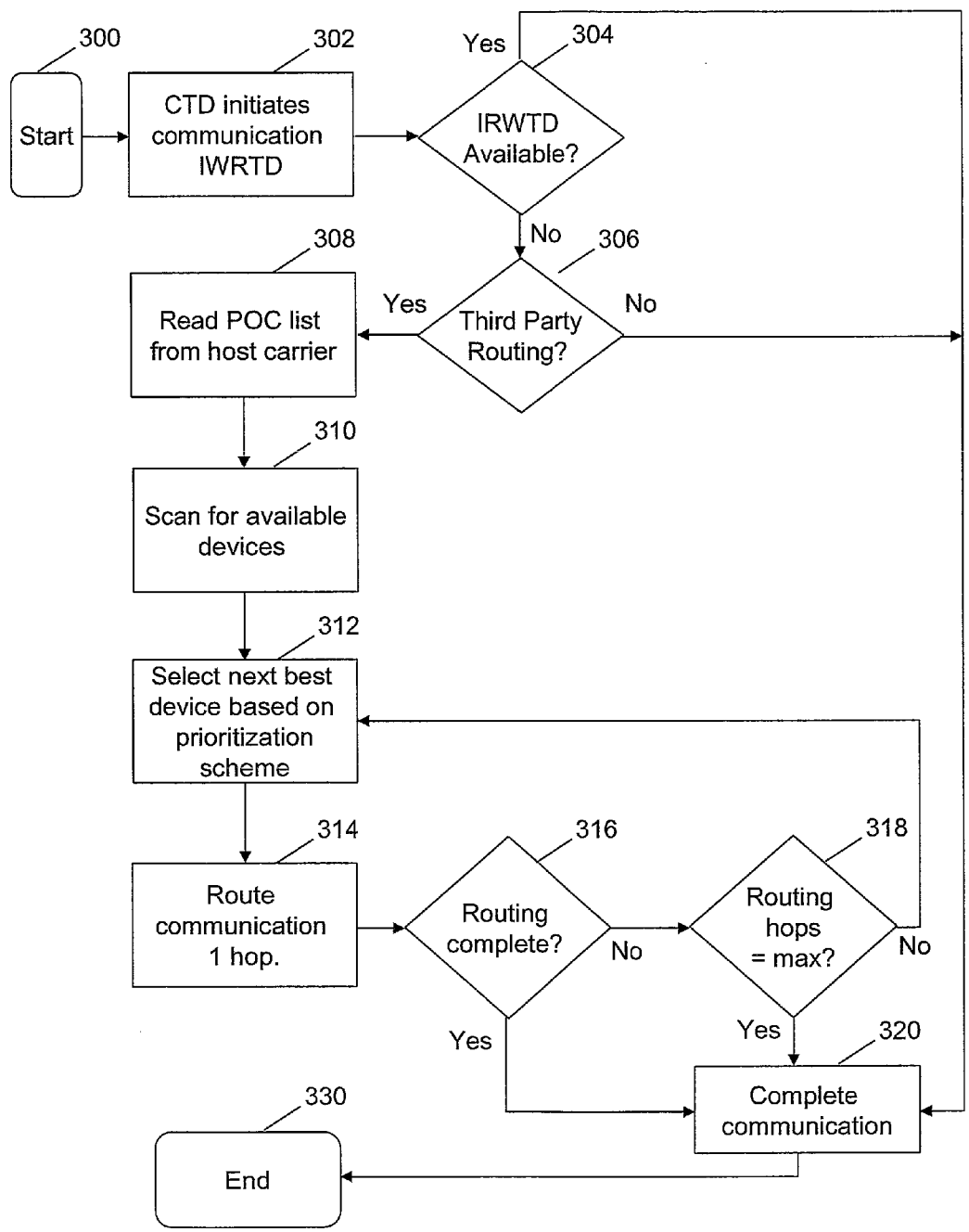
FIG. 3. is a high-level logical flowchart of an exemplary set of steps performed while performing re-routing of a phone call through a third party alternate telecommunication device.

With reference now to FIG. 3, a high-level logical flowchart of an exemplary set of steps for performing re-routing of a phone call to a third party alternate telecommunication device; and performed to route a phone call based on caller input is presented. After initiator block 300, a communication is initiated from a Caller Telecommunication Device (CTD) to an Intended Receiving Wireless Telecommunication Device (IRWTD) (block 302). It is then determined by the Host Carrier if the IRWTD is available (block 304). If IRWTD is available, the call is completed (block 320) and the process ends at terminator block 330. When IRWTD is not available, the CTD pings the host carrier to determine if a third party routing priority of contacts (POC) list has been established by the user of IRWTD (block 306). If a POC list has not been established the call is routed to voicemail, where the user of CTD may leave a message for IRWTD retrievable when IRWTD becomes available (block 320). The process then ends at terminator block 330.

If a POC list has been established the host carrier reads the POC list and determines the potential alternate telecommunication devices (ATDs) suitable for receiving a re-route of the original communication (block 308). Host carrier then initiates a scan of the available ATDs utilizing a network cellular broadcast, a third party connection, such as the Internet, or common hardware based wireless technology for a connection to IRWTD (block 310). Host carrier selects the first ATD returning a response as the future recipient ATD of the communication (block 312). Following the host carrier selecting the desired ATD as the recipient of the communication, the host carrier routes the communication one 'hop' to the selected ATD (block 314). The recipient ATD of the communication then determines if a direct connection to IRWTD by another hardware based technology (e.g., wireless personal area network, local area network, the internet, etc.) is available (block 316). If a connection exists between the recipient ATD of the communication, then the communication is re-routed through the recipient ATD to IRWTD (block 320). The process then terminates at block 330.

When the communication cannot be re-routed through the recipient ATD to IRWTD, the host carrier determines if the maximum routing attempts have been met (block 318). If the maximum number of routing attempts have not been met then the process loops back to block 312 in an iterative manner to determine if the communication can be further routed through a second ATD utilizing a third party connection, such as the Internet, or common hardware based wireless technology between the first ATD and a second ATD to IRWTD.

When the maximum routing attempts have been met and the communication has not been connected between CTD and IRWTD the call is routed to voicemail, where the user of CTD may leave a message for IRWTD retrievable when IRWTD becomes available (block 320). The process then terminates at block 330.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a non-writable storage media (e.g. CD-ROM) and writable storage media (e.g. a floppy diskette, hard disk drive, read/write CD-ROM, optical media). Further, it should be understood that the present invention may be implemented by a system in the form of hardware or a combination of software and hardware as described herein or their equivalent. As used herein, the term computer-readable storage device does not encompass a signal propagation media, such as a copper cable, optical fiber, or wireless transmission media.

Having thus described the invention of the present application in detail and by reference to preferred embodiments thereof, it will be apparent that modifications and variations are possible without departing from the scope of the invention defined in the appended claims.

The invention claimed is:

1. A method of routing a communication, the method comprising:
   a caller device transmitting, to a host carrier, a request to transmit a communication from the caller device to a mobile receiving device using a wireless mobile telecommunication network that includes a wireless transmission tower configured to communicate with the receiving device; and
   in response to receiving a notification that the communication cannot be routed to the receiving device via the wireless mobile telecommunication network, the caller device transmitting an instruction to the host carrier to:
      identify a plurality of alternate telecommunication devices that are configured for short range wireless transmission and are available for receiving a re-route of the communication,
      request that each of the alternate telecommunication devices scan for the presence of the receiving device within range of the short range wireless transmission,
      identify a priority of contacts policy established by preferences of a user of the caller device that indicates a first one of the alternate telecommunication devices that has a higher priority than remaining ones of the alternate telecommunication devices to communicate with the receiving device by the short range wireless transmission, and
      in response to identifying the first one of the alternate telecommunication devices, transmit the communication from the caller device to the receiving device via the first one of the alternate telecommunication devices using the short range wireless transmission.

2. The method of claim 1, wherein the instruction from the caller device further instructs the host carrier to:
   in response to an attempt to transmit the communication to the receiving device via the first one of the alternate telecommunication devices failing, attempt to transmit the communication to the receiving device via the first one of the alternate telecommunication devices and a second one of the alternate telecommunication devices, wherein the second one of the alternate telecommunication devices is identified by the priority of contacts policy.

3. The method of claim 2, wherein the priority of contacts policy is stored on the host carrier.

4. The method of claim 2, wherein the priority of contacts policy specifies a maximum number of re-routing hops that are authorized to be made from the first one of the alternate telecommunication devices to the second one of the alternate telecommunication devices.

5. The method of claim 2, wherein the alternate telecommunication devices are able to wirelessly communicate via a same multiple user network by utilizing a common short range wireless technology.

6. The method of claim 2, wherein the alternate telecommunication devices communicate via a Transmission Control Protocol/Internet Protocol (TCP/IP) network.

7. The method of claim 1, wherein the communication is a text based message, and wherein the instruction from the caller device further instructs the host carrier to:
   in response to an attempt to transmit the text based message to the receiving device succeeding, autonomously transmit an automated delivery notification message to the caller device indicating the text based message was delivered successfully.

8. The method of claim 1, wherein the communication is a voice call, and wherein the instruction from the caller device further instructs the host carrier to:
   in response to attempts to transmit the voice call to the receiving device exceeding a maximum number of permitted re-routing attempts, autonomously re-route the communication to a voicemail service.

9. A telecommunication device comprising:
   a telecommunications transceiver for communicating over a communication system, wherein the telecommunications transceiver is operative to transmit, to a host carrier, a request to transmit a communication from a caller, who is using the telecommunication device, to a mobile receiving device using a wireless mobile telecommunication network that includes a wireless transmission tower configured to communicate with the receiving device, and wherein the telecommunication device is a caller device; and
   a processor configured to, in response to receiving a notification that the communication cannot be routed to the receiving device via the wireless mobile telecommunication network, instruct the telecommunications transceiver to transmit an instruction to the host carrier, wherein the instruction directs the host carrier to:
      identify a plurality of alternate telecommunication devices that are configured for short range wireless transmission and are available for receiving a re-route of the communication,
      request that each of the alternate telecommunication devices scan for the presence of the receiving device within range of the short range wireless transmission,
      identify a priority of contacts policy established by preferences of a user of the caller device that indicate a first one of the alternate telecommunication devices that has a higher priority than remaining ones of the alternate telecommunication devices to communicate with the receiving device by the short range wireless transmission, and
      in response to identifying the first one of the alternate telecommunication devices, transmit the communication from the caller device to the receiving device via the first one of the alternate telecommunication devices using the short range wireless transmission.

10. The telecommunication device of claim 9, wherein the instruction to the host carrier further instructs the host carrier to
   in response to an attempt to transmit the communication to the receiving device via the first one of the alternate telecommunication devices failing, attempting to transmit the communication to the receiving device via the first one of the alternate telecommunication devices and a second one of the alternate telecommunication devices, wherein the second one of the alternate telecommunication devices is identified by the priority of contacts policy.

11. The telecommunication device of claim 10, wherein the priority of contacts policy is stored on the host carrier.

12. The telecommunication device of claim 10, wherein the priority of contacts policy specifies a maximum number of re-routing hops that are authorized to be made from the first one of the alternate telecommunication devices to the second one of the alternate telecommunication devices.

13. The telecommunication device of claim 10, wherein the alternate telecommunication devices are able to wirelessly communicate via a same multiple user network by utilizing a common short range wireless technology.

14. The telecommunication device of claim 10, wherein the alternate telecommunication devices communicate via a Transmission Control Protocol/Internet Protocol (TCP/IP) network.

15. The telecommunication device of claim 9, wherein the communication is a text based message, and wherein the instruction to the host carrier further instructs the host carrier to
   in response to an attempt to transmit the text based message to the receiving device succeeding, autonomously transmitting an automated delivery notification message to the caller device indicating the text based message was delivered successfully.

16. The caller telecommunication device of claim 9, wherein the communication is a voice call, and wherein the instruction to the host carrier further instructs the host carrier to:
   in response to attempts to transmit the voice call to the receiving device exceeding a maximum number of permitted re-routing attempts, autonomously re-routing the communication to a voicemail service.

17. A computer program product, comprising:
   one or more computer-readable storage devices; and
   a plurality of instructions stored on the computer-readable storage devices, wherein the instructions, when executed by one or more processors, configure the processors to:
   transmit, to a host carrier, a request to transmit a communication from a caller device to a mobile receiving device using a wireless mobile telecommunication network that includes a wireless transmission tower configured to communicate with the receiving device; and
   in response to receiving a notification that the communication cannot be routed to the receiving device via the wireless mobile telecommunication network, transmit an instruction from the caller device to the host carrier to determine whether the receiving device has previously set up a plurality of alternate devices for receiving a re-route of the communication, wherein the instruction from the caller device instructs the host carrier to:
      identify the alternate telecommunication devices that are configured for short range and are available for receiving a re-route of the communication, request that each of the one or more available alternate devices scan for the presence of the receiving device within range of the by a common short range wireless technology between the alternate transmission,
      identify a priority of contacts policy established by preferences of a user of the caller device that indicates a first one of the alternate telecommunication devices that has a higher priority than remaining ones of the alternate telecommunication devices to communicate with the receiving device by the short range wireless transmission, and in response to identifying the first one of the alternate telecommunication devices, transmit the communication from the caller device to the receiving device via the first one of the alternate telecommunication devices using the short range wireless transmission.

18. The computer program product of claim 17, wherein the instruction from the caller device further instructs the host carrier to:

in response to an attempt to transmit the communication to the receiving device via the first one of the alternate telecommunication devices failing, attempt to transmit the communication to the receiving device via the first one of the alternate telecommunication devices and a second one of the alternate telecommunication devices, wherein the second one of the alternate telecommunication devices is identified by the priority of contacts policy.

19. The computer program product of claim 18, wherein the priority of contacts policy is stored on the host carrier.

20. The computer program product of claim 18, wherein the priority of contacts policy specifies a maximum number of re-routing hops that are authorized to be made from the first one of the alternate telecommunication devices to the second one of the alternate telecommunication devices.

* * * * *